J. W. TITUS.
FRONT AXLE COUPLING.
APPLICATION FILED MAR. 13, 1914.
1,106,751.
Patented Aug. 11, 1914.
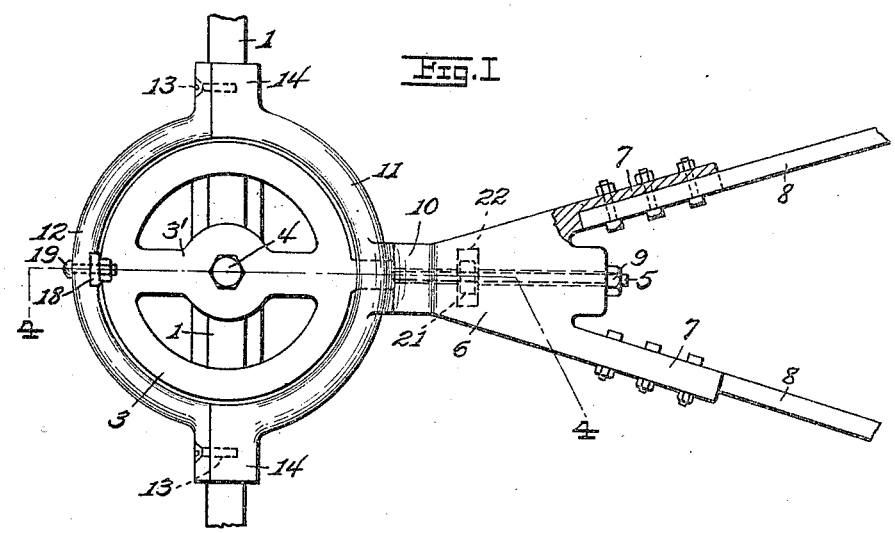
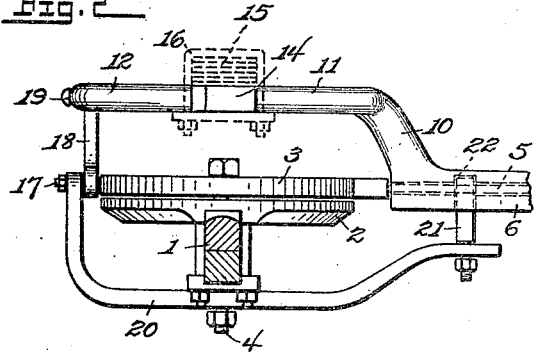
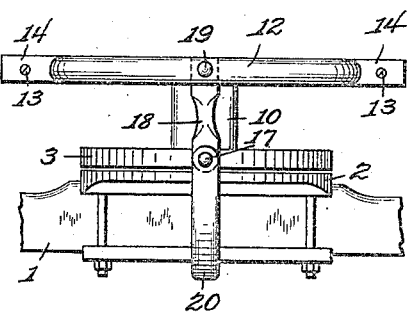
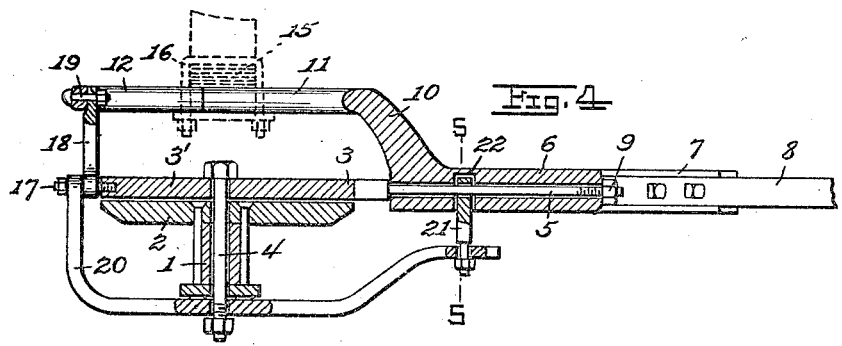
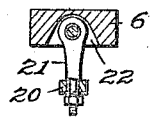
WITNESSES:
INVENTOR
John W. Titus.
BY
ATTORNEY

UNITED STATES PATENT OFFICE.

JOHN W. TITUS, OF MANNINGTON, WEST VIRGINIA.

FRONT-AXLE COUPLING.

1,106,751.   Specification of Letters Patent.   Patented Aug. 11, 1914.

Application filed March 13, 1914. Serial No. 824,350.

*To all whom it may concern:*

Be it known that I, JOHN W. TITUS, a citizen of the United States of America, and resident of Mannington, county of Marion, and State of West Virginia, have invented certain new and useful Improvements in Front-Axle Couplings, of which the following is a specification.

This invention relates broadly to front axle couplings for vehicles, and more specifically to a fifth-wheel and connecting means therefor.

The primary object of the invention is to provide a flexible swivel-like connection between the reach and the front axle of a vehicle whereby the strains due to the rocking or tilting movements of the parts in rough road travel are reduced to a minimum.

A further object is to provide a simple and durable device which permits of universal movement of the front axle with respect to the reach, thus eliminating to a great extent the torsional strains to which the running-gear is subjected in the usual vehicle construction.

With these and other objects in view, the invention resides in the features of construction, arrangement of parts and combinations of elements which will hereinafter be fully described, reference being had to the accompanying drawings, forming a part of this specification, in which—

Figure 1 is a top plan view of the invention; Fig. 2 is a side elevation of the same; Fig. 3 is a front elevation; Fig. 4 is a section on the line 4—4, Fig. 1; and Fig. 5 is a section on line 5—5, Fig. 4.

Referring to said drawings, in which like designating characters distinguish like parts throughout the several views—1 indicates the front axle of a vehicle, the same having rigidly mounted thereon the lower ring 2 of a fifth-wheel. Overlying and rotatable on said ring 2 is the upper ring 3 of the fifth-wheel, a king-bolt 4 being directed centrally through a diametrically extending cross-member 3' provided on said ring 3 and serving to pivot said ring to the axle, as shown. Extending rearward from the upper ring 3 and preferably formed integral therewith is a rod or stem 5 upon which is mounted a bearing member 6 which has rearwardly directed outwardly inclined arms 7 to which the usual divergent reach rods 8 are rigidly connected, said rod or stem having rotary movement in said bearing member and having a nut 9 threaded upon its end, as shown. The bearing member supports thereon, or has formed integral therewith, an upwardly and forwardly inclined arm 10 which constitutes the principal support for a circular spring-supporting platform which occupies an elevated position over the fifth-wheel, said platform comprising two substantially semi-circular members 11 and 12, the member 11 being preferably made integral with said arm and the member 12 being rigidly attached to said member 11, as by bolts or screws 13. Oppositely disposed lateral portions 14 carried by or formed on said platform constitute seats upon which the usual vehicle spring 15 is clamped, as by the usual shackles 16. A pin, bolt, or like device 17 is carried at the front edge of the ring 3 of the fifth-wheel, the same being loosely embraced at a point adjacent to said ring by the lower end of an upright supporting member 18, the upper end of which is rigidly attached, as by a bolt 19, to the foremost portion of the platform member 12. Loosely embracing said pin 17 adjacent to said supporting member 18 is the front end of a strap 20 which underlies the axle 1 and through which the lower end of the king-bolt 4 is projected, as shown. From its point of attachment to the axle said strap extends rearward and has its rear end attached to the lower end of a hanger 21 which is attached at its upper end to the rod or stem 5. Said hanger is adapted for lateral swinging movement with the rocking movements of the axle, a recess 22 of suitable form and dimensions to permit such movement being provided in the under face of the bearing member 6.

From the foregoing it will be seen that the front axle is free to turn not only in a horizontal direction, as ordinarily, but also in a vertical direction with respect to the vehicle body—that is, said axle has a free universal range of movement. Thus, the transmission of road shocks to the body of the vehicle, due to irregularities in the road surface, is largely eliminated, and the strains which so frequently result in broken or distorted fifth-wheels and reaches are prevented.

What is claimed is—

1. In a coupling, the combination with the front axle and reach, of a fifth-wheel comprising upper and lower rings, the lower ring rigidly mounted upon said axle and the upper ring having a central pivotal connection with said axle, a bearing member rigidly attached to the reach, a rearwardly directed stem carried by the upper ring and rotatable in said bearing member, and a spring supporting platform occupying an elevated position over said fifth-wheel and supported at one side by said bearing member, and means sustained by said upper ring disposed in supporting relation to the opposite side of said platform.

2. In a coupling, the combination with the front axle and reach, of a fifth-wheel comprising upper and lower rings, the lower ring rigidly mounted upon said axle and the upper ring having a central pivotal connection with said axle, a bearing member rigidly attached to the reach, a rearwardly directed stem carried by the upper ring and rotatable in said bearing member, a spring-supporting platform occupying an elevated position over said fifth-wheel, and supporting means for said platform whereby the weight of the latter is imposed on the upper ring of the fifth-wheel.

3. In a coupling, the combination with the front axle and reach, of a fifth-wheel, comprising upper and lower rings, the lower ring rigidly mounted upon said axle and the upper ring having a central pivotal connection with said axle, a bearing member rigidly attached to the reach, a rearwardly directed stem carried by the upper ring and rotatable in said bearing member, an upwardly and forwardly inclined arm carried by said bearing member, an upright supporting member carried by said upper ring at the side opposite said arm, and a spring supporting platform sustained jointly by said arm and said supporting member.

4. In a coupling, the combination with the front axle and reach, of a fifth-wheel comprising upper and lower rings, the lower ring rigidly mounted upon said axle and the upper ring having a central pivotal connection with said axle, a bearing member rigidly attached to the reach, a rearwardly directed stem carried by the upper ring and rotatable in said bearing member, a spring-supporting platform occupying an elevated position over said fifth-wheel, said platform approximating the fifth-wheel in diameter, and supporting means for said platform located at the front and rear of the upper ring of the fifth-wheel, said means permitting vertical oscillation of said fifth-wheel with respect to said platform.

5. In a coupling, the combination with the front axle and reach, of a fifth-wheel comprising upper and lower rings, the lower ring rigidly mounted upon said axle and the upper ring having a central pivotal connection with said axle, a bearing member rigidly attached to the reach, a rearwardly directed stem carried by the upper ring and rotatable in said bearing member, a spring-supporting platform occupying an elevated position over said fifth-wheel, supporting means for said platform whereby the weight of the latter is imposed on the upper ring of the fifth-wheel, and an axle-underlying strap having pivotal connection with the upper ring at points both in front of and in the rear of said axle.

In testimony whereof, I affix my signature in presence of two subscribing witnesses.

JOHN W. TITUS.

Witnesses:
 JAMES DEVORE,
 ELMINA DEVORE.

Copies of this patent may be obtained for five cents each, by addressing the "Commissioner of Patents, Washington, D. C."